United States Patent

[11] 3,596,200

[72] Inventors Delbert C. Fausey, Jr.
San Jose;
Russell W. Ralphs, Concord, both of, Calif.
[21] Appl. No. 836,045
[22] Filed June 24, 1969
[45] Patented July 27, 1971
[73] Assignee International Water and Control Systems, Ltd.
Montego Bay, Jamaica

[54] SIMULTANEOUS COMPLEMENTARY OUTPUT PULSE GENERATOR
31 Claims, 5 Drawing Figs.

[52] U.S. Cl. .................................................. 331/75,
307/265, 307/293, 328/55
[51] Int. Cl. .................................................... H03k 1/14,
H03k 1/16, H03k 1/18
[50] Field of Search ........................................ 331/75;
328/55; 307/265, 293

[56] References Cited
UNITED STATES PATENTS
3,371,252  2/1968  James ........................... 307/265 X
3,402,353  9/1968  Hubbs ............................ 307/265 X Primary Examiner—Roy Lake
Assistant Examiner—Siegfried H. Grimm
Attorney—John J. Leavitt ABSTRACT: Presented is a pulse generator that is selectively operable from an AC or a DC source of power. The pulse generator produces a pair of complementary DC coupled outputs. Pulse amplitude is continuously adjustable up to 10 volts, as are pulse width, from 50 nanoseconds to 20 milliseconds, and repetition rate from 1 hertz to 10 megahertz. Rise and fall times are typically 6 nanoseconds when the pulse generator feeds into a 50 ohm load. The pulse generator can feed almost any digital system; it directly drives resistor-transistor, diode-transistor and transitor-transistor logic circuits. From the viewpoint of organization, the apparatus comprises an oscillator, the output from which is connected to a delay control circuit, the output of which is divided into positive and negative going pulses channeled into a pair of output branch circuits. One branch feeds a width control circuit while the other branch feeds a differentiating network, the latter network functioning to provide a reference pulse for comparison with the complementary outputs from an amplifier connected to the two complementary output channels emanating from the width control circuit.

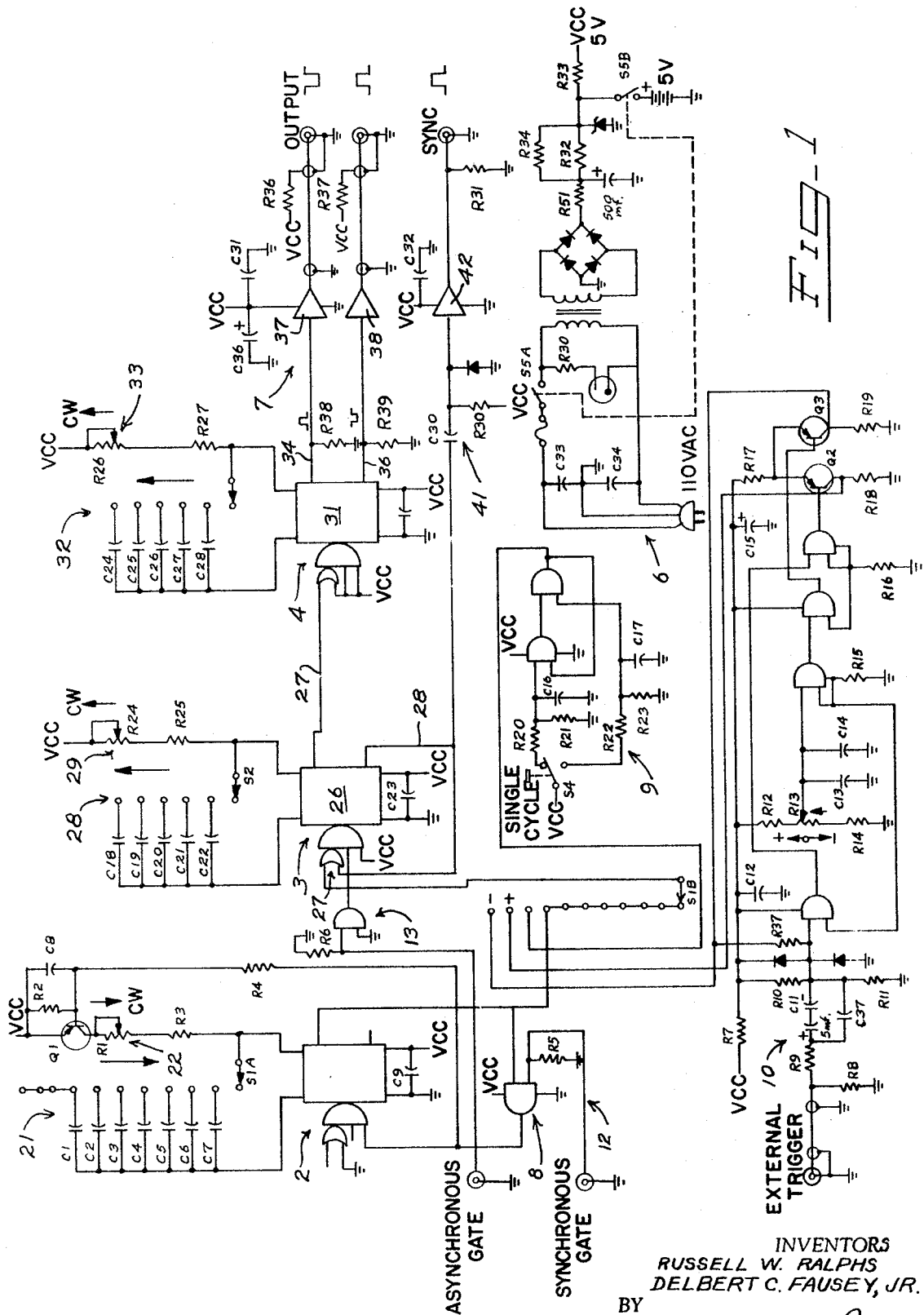

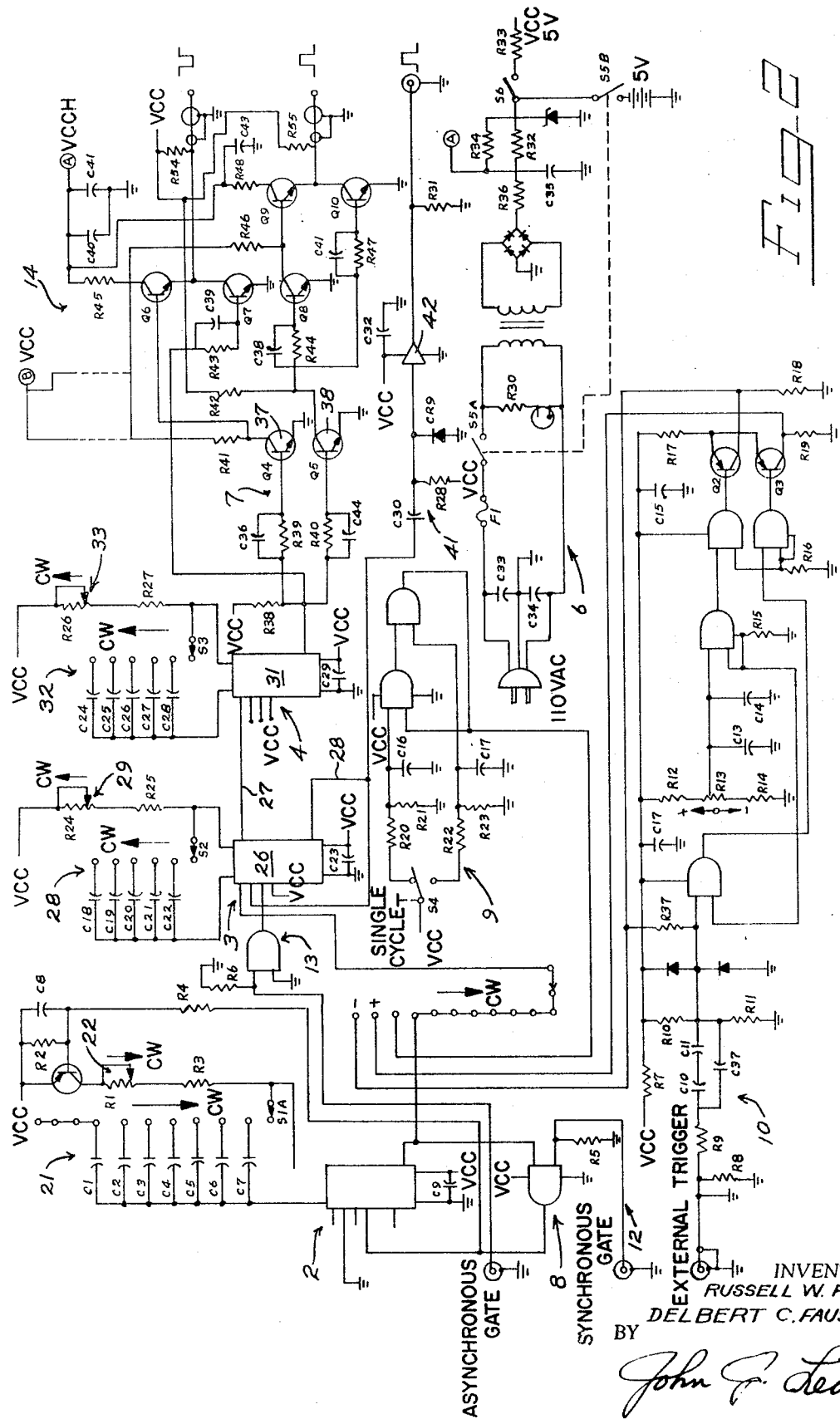

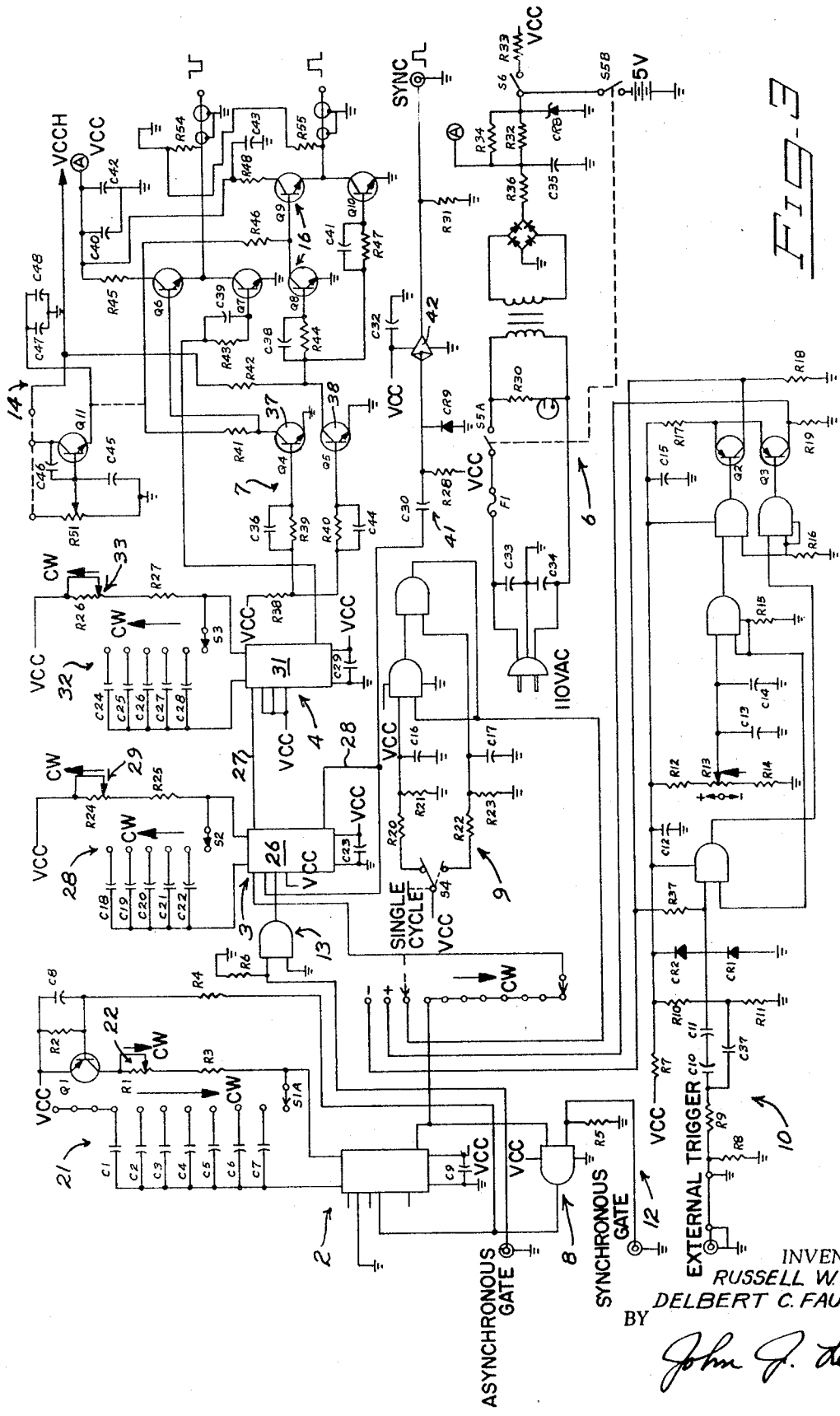

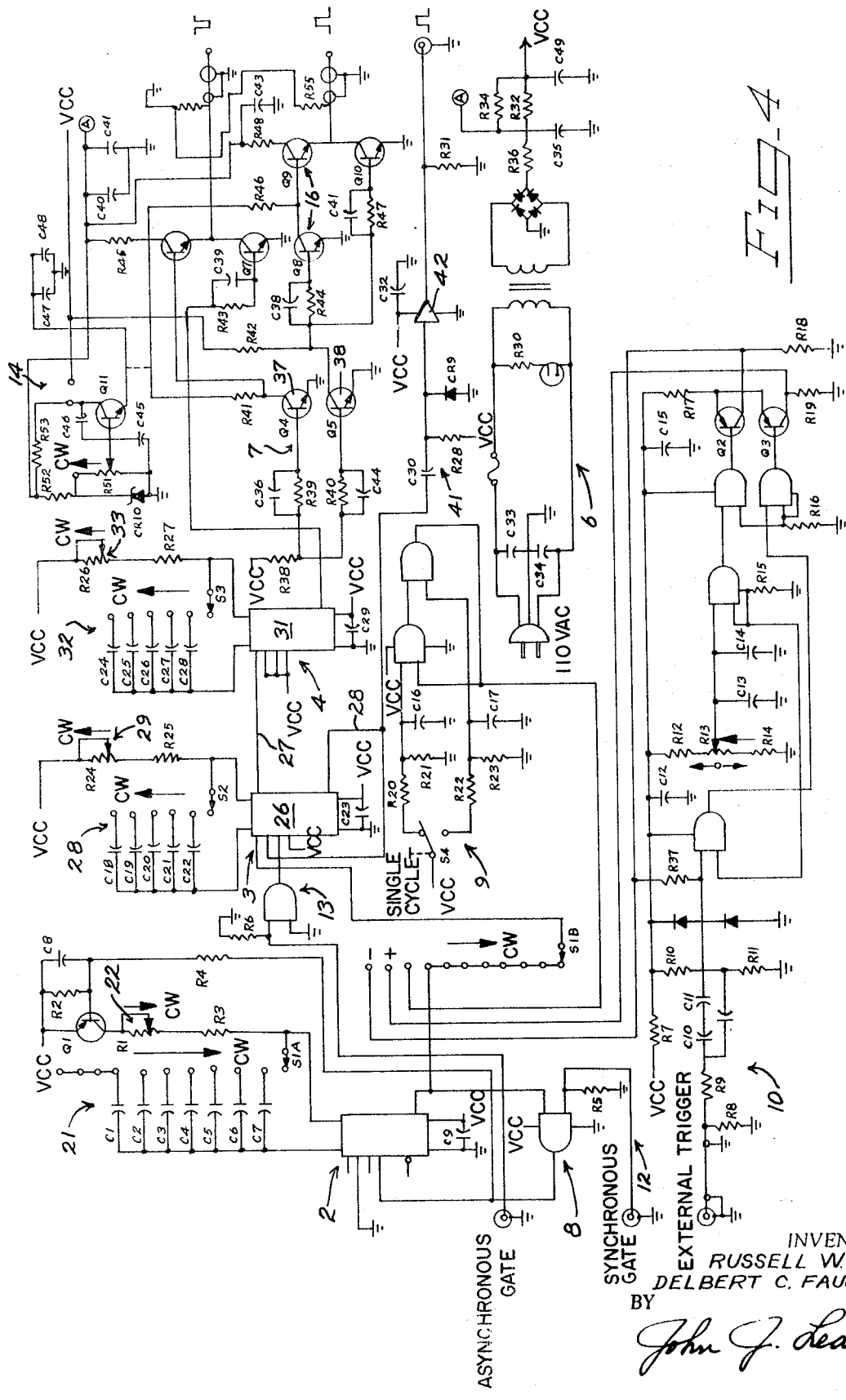

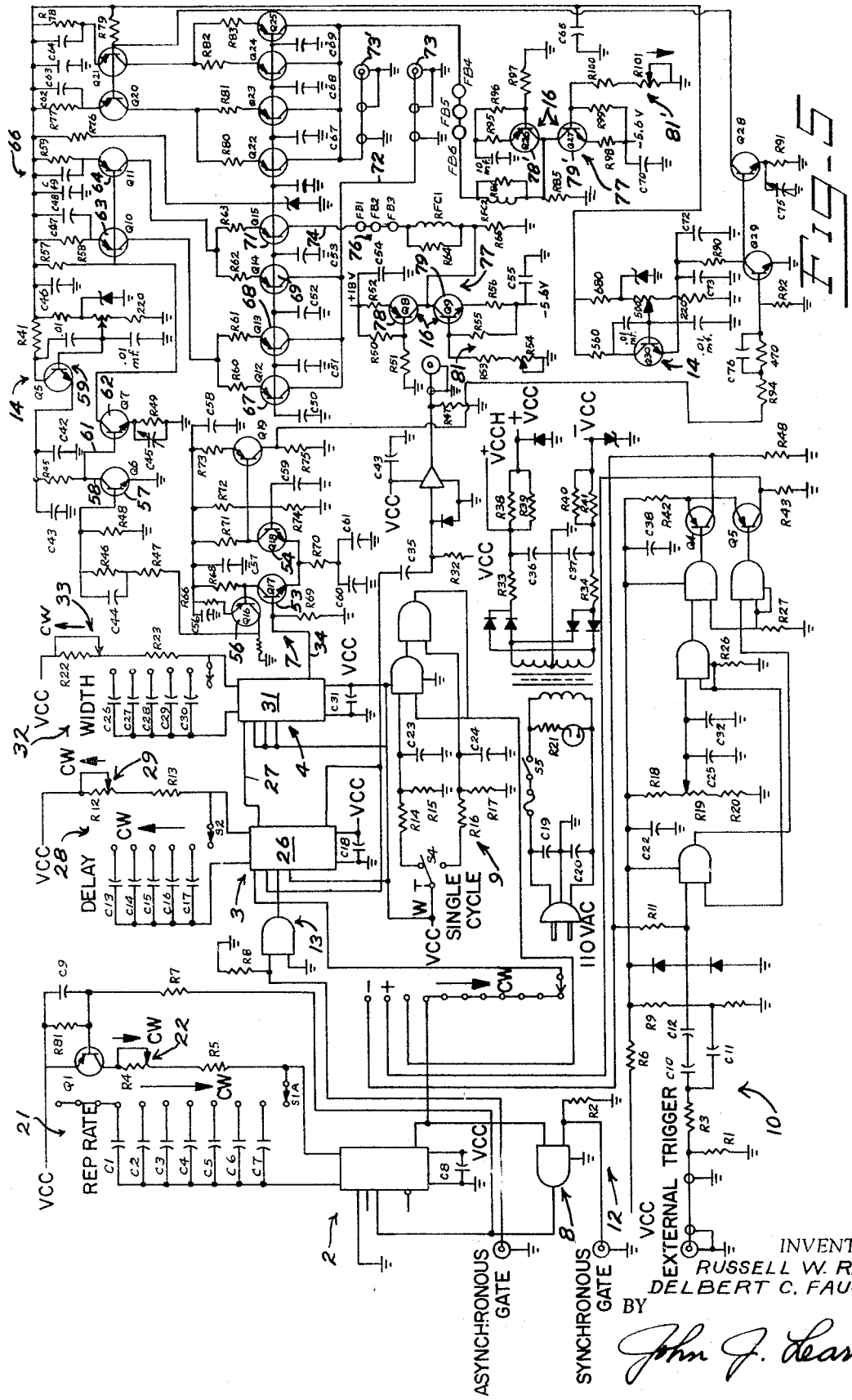

SIMULTANEOUS COMPLEMENTARY OUTPUT PULSE GENERATOR

BACKGROUND OF INVENTION

Electronic equipment used by engineers versed in today's technology is frequently portable. For instance, portable oscilloscopes are quite common. A definite need has arisen for such portable oscilloscopes in the field where an alternating current power source is unavailable. Accordingly, it is one of the objects of the present invention to provide an alternating current-battery operated pulse generating power source for use in conjunction with portable electronic equipment.

To be of special usefulness, an alternating current-battery operated pulse generating power supply should provide a range of object of the present invention in pulse amplitude, pulse width and in the repetition rate of the pulse output. Accordingly, it is another object of the invention to provide an alternating current-battery operated pulse generator in which the pulse amplitude is continuously adjustable up to 10 volts, in which the pulse widths are adjustable from 50 nanoseconds to 20 milliseconds and in which the repetition rate is adjustable from 1 hertz to 10 megahertz.

It is another object of the invention to provide an alternating current-battery operated pulse generating power supply incorporating pulse delay circuit variable over 100 percent of the pulse period.

Still another object of the invention is the provision of an alternating current-battery operated pulse generating power supply provided with a front panel pushbutton which enables operation of the generator to produce one cycle of output energy. For wide application of a power supply to state of the art electronic gear, it is important that the power supply be capable of gated operation, both synchronous and asynchronous. Accordingly, it is a still further object of the invention to provide an alternating current-battery operated pulse generating power supply having a synchronous gating circuit operable to control the internal repetition rate of the pulse generator by establishing an accurate correlation between the leading edge of the gate signal and the first pulse in the pulse burst from the oscillator.

The invention possesses other objects and features of advantage, some of which, with the foregoing, will become apparent from the following description and the drawings. It is to be understood however that the invention is not limited to the embodiment illustrated and described, as it may be embodied in various forms within the scope of the appended claims.

BRIEF SUMMARY OF DISCLOSURE

In terms of broad inclusion, the alternating current-battery operated pulse generating power supply of the invention comprises an oscillator in the form of a free-running multivibrator the output from which is connected into a delay control circuit including a single-shot multivibrator the output from which is divided into positive and negative going complementary DC pulses channeled into a pair of output branch circuits. One of the output branch circuits is fed into a width control circuit constituting a single-shot multivibrator of the same type used in the delay control circuit, and the other output branch circuit is channeled into a differentiating network the output of which provides a reference pulse for comparison with the complementary outputs from an amplifier connected to the two complementary outputs emanating from the width control circuit. External trigger, single cycle and synchronous and asynchronous gating circuits are provided for versatility in the application of the alternating current-battery operated pulse generating power supply. Additionally, amplitude and offset control circuits are provided, the former adjustable to control the amplitude of the output pulses, while the latter is adjustable to control the relationship of each pulse with respect to ground or other frame of reference.

DESCRIPTION OF DRAWINGS

FIG. 1 is a wiring diagram illustrating the pulse generator of the invention in one of its aspects which may be categorized as a first generation pulse generator.

FIGS. 2, 3 and 4 are separate wiring diagrams illustrating three different aspects of the pulse generator of the invention with each of these wiring diagrams falling into a family which may be categorized as a second generation pulse generator.

FIG. 5 is a wiring diagram illustrating a third generation pulse generator of the invention.

DESCRIPTION OF PREFERRED EMBODIMENT

In terms of greater detail, the simultaneous complementary output pulse generator of the invention comprises an oscillator circuit designated generally by the numeral 2, signals, output from which is fed into a pulse delay control circuit designated generally by the numeral 3, the output from which in turn is fed into a pulse width control circuit sequentially connected to the output of the pulse delay control circuit and adjustable to control the width of pulses emanating therefrom. The circuit is appropriately energized by an alternating current-battery operated power supply designated generally by the numeral 6. Output from the pulse width control circuit is fed into an appropriate amplifier circuit designated generally by the numeral 7, the output of which is characterized by complementary output pulses for use in any desired manner. In one aspect of the invention a synchronous amplifier circuit designated generally by the numeral 8 is interposed between the oscillator and the delay control circuit. In another aspect of the invention, a single-cycle control circuit of the flip-flop or multivibrator type is provided designated generally by the numeral 9 and operable to selectively transmit a single pulse to trigger the delay circuit 26, thus producing one complete cycle of operation. Additionally, an external trigger circuit 10 is provided for use as might be desired by the operator of the pulse generator.

A synchronous gating circuit 12 is also provided operatively associated with the oscillator and adjustable to control the pulse bursts emanating from the oscillator in synchronism with the pulses from the output of the synchronous gating circuit. An asynchronous gating circuit 13 is also provided operably connected between the oscillator and the delay control circuit and adjustable to control the time factor between pulse bursts emanating from the oscillator. To provide wide applicability and versatility of application of the pulse generator, an amplitude control circuit 14 is provided adjustable from the front panel of the pulse generator to control the amplitude of the output pulses from the amplifier. While front panel control is described, it will of course by apparent that remote control of these functions is also contemplated. Finally, a pulse offset control circuit 16 is provided associated with each of the output terminals of the amplifier and selectively adjustable to shift an output pulse relative to ground without changing the absolute amplitude of the pulse.

While the foregoing described in general terms the major components and their interrelationship as embodied in the three different forms of the invention, each of the components discussed above will be described in more complete detail hereinafter.

OSCILLATOR CIRCUIT

The oscillator circuit has at its heart a solid-state free-running multivibrator which functions to convert DC from the power supply to controllable nonsinusoidal AC positive pulses each having positive and "negative-going" edges. The frequency of the pulse output from the oscillator is controlled through a switching network designated generally by the numeral 21, comprising a pushbutton switch effective upon actuation to insert into or delete from the circuit capacitors of various ratings. The switching network operates in conjunction with an adjustable vernier 22. The multivibrator chosen for the oscillator is preferably an integrated circuit-type. One type of multivibrator packaged in integrated circuit form that has been found to be satisfactory is a Fairchild TTuL 9601, arranged and associated with other components so as to have a repetition rate of up to 10 megahertz, and an abrupt transition in amplitude in the order of 5 nanoseconds. This oscillator is capable of adjustment for operation on a 100 percent duty cycle, meaning that the active period of the pulse can be adjusted up to 100 percent of the total period of the pulse and possesses a temperature stability of a tenth of 1 percent for each 25° Centigrade variation in temperature. In the circuit illustrated, the oscillator is arranged to dump its output pulses into the delay control circuit as shown.

PULSE DELAY CONTROL CIRCUIT

Like the oscillator circuit, the heart of the pulse delay control circuit in the embodiment illustrated in FIG. 1 comprises a Fairchild TTuL 9601 integrated circuit component designated generally by the numeral 26 and having on its input side logical AND and OR gates designated generally by the numeral 27 which allow synchronous gating of the pulse delay control circuit or switching in of pulses from the external trigger circuit. Operation of the pulse delay control circuit is controlled through an appropriate switching network designated generally by the numeral 28, including a plurality of separate capacitors as illustrated having varying values of capacitance, switched into the circuit in conjunction with operation of a vernier potentiometer designated generally by the numeral 29.

The output of the pulse delay control circuit is adjustable up to a 100 percent duty cycle, with the transition time of pulses bring in the order of 5 nanoseconds. The output of the pulse delay control circuit is complementary in that pairs of pulses emanate from the multivibrator 26, which is preferably of the monostable type, with the complementary pulses being channeled into two different branch circuits 27 and 28. As shown in the drawing, branch circuit 28 not only provides the sync pulses but also feeds back a gate pulse to the input gate of the delay circuit so as to nullify the triggering effect of a predetermined number of input pulses during the delay period.

PULSE WIDTH CONTROL CIRCUIT

The pulses channeled into circuit circuit 27 are fed into the input side of the pulse width control circuit 4 which, like the pulse delay control circuit, is designed around a solid-state multivibrator designated generally by the numeral 31, preferably comprising a Fairchild TTuL 9601, commonly known as a medium scale integrated circuit package. The width control circuit is controlled as to the frequency of its complementary output pulses by a switching network designated generally by the numeral 32 which may be remotely controlled or controlled from the front panel of the pulse generator housing through an appropriate vernier 33. Again, the transition time of the complementary output pulses is in the range of 5 nanoseconds, with the width of each of the pulses being controllable independently within the range from 35 nanoseconds to 3 or 4 seconds.

The output signals from the multivibrator 31 are simultaneous in that when one pulse is exhibiting a positive transition, the other pulse (disjunction). exhibiting a negative-going transition. In the embodiment of the circuit illustrated in FIG. 1, constituting the first generation pulse generator, at no time do the complementary pulses progress below ground level. It is important to note that the width control circuit adjusts the trailing edge of each pulse and triggers off the trailing edge of a pulse from the delay control circuit. Stated another way, leading edge each pulse from the control pulse circuit is triggered by the trailing edge of a pulse emanating from the pulse delay control circuit. The trailing edge of each pulse is controlled by an adjustment of the vernier potentiometer 33, actuation of which operates the rotary switching network 32. It should be noted that reducing the capacitance reduces the width of each pulse, with the result that when no capacitance except the distributed capacitance in the circuit itself is present, the fastest operation of the circuit is obtained. It will of course be understood that the output signals from the pulse width control circuit are relatively weak signals. They are fed into two different output branches 34 and 36 each, respectively, fed into amplifiers 37 and 38.

AMPLIFIER CIRCUIT

Amplifiers 37—38 are preferably integrated circuit types in the first generation pulse generator illustrated in FIG. 2, providing twin channels of amplification in a single package. In the second and third generation pulse generators the amplifiers are preferably formed by discrete components as illustrated. The transition time is preferably in the order of 5 nanoseconds, in either case, with the output being at least 50 milliamps feeding into a 50 ohm coaxial cable.

As noted above, the output from the pulse delay control circuit 3 constitutes a pair of complementary output pulses fed into complementary branches 27 and 28. One branch feeds into the pulse width control circuit as previously explained, while the other branch 28 feeds into a differentiating network designated generally by the numeral 41. The differentiating network responds to the positive transition of each incoming pulse. The positive-going transition of each pulse is then amplified by amplifier 42 so that the pulse that appears in the output of the amplifier 42 is the amplified derivative of the pulse imposed on the input of the differentiating network. Such an amplified positive-going transition is necessary to provide an accurate and time-stable pulse for synchronizing an associated oscilloscope or another generator.

Referring to FIGS. 2, 3 and 4, and comparing these Figures with FIG. 1, it should be noted that with respect to the amplifier circuit designated generally by the numeral 7 in FIG. 1, the corresponding amplifier circuit in FIG. 2 has been modified to provide more power gain. The essential difference between the first generation pulse generator (FIG. 1) and the second generation pulse generator (FIG. 2) is that the integrated circuit type amplifier package utilized in the first generation pulse generator has been replaced by discrete components in the form of transistors which are inherently capable of handling more power than the integrated circuits illustrated in FIG. 1.

Another distinction between the first generation pulse generator of FIG. 1 and the second generation pulse generator of FIG. 2 is that in the latter there has been added an amplitude control circuit designated generally by the numeral 14 as previously noted.

With respect to the third generation pulse generator illustrated in FIG. 5, the essential difference between this pulse generator and that illustrated as a second generation pulse generator in FIGS. 2 through 4 is that in the embodiment of the pulse generator illustrated in FIG. 5 the amplifiers and offset control circuits have been modified as will hereinafter appear.

Referring to FIG. 5, a positive amplitude pulse emanating from pulse width control circuit 4 is channeled by lead 34 to the input base of transistor 53, the emitter of which is connected in common with a similar transistor 54. The collector terminal of transistor 53 is connected to the base terminal of transistor 56, the collector of which is connected to the base of transistor 57. The emitter of transistor 57 is grounded and the collector is connected through a lead 58 to an amplitude control circuit designated generally by the numeral 59. Transistor 57 is also connected through a lead 61 to the base of transistor 62, the collector output from which is channeled to transistors 63 and 64. These latter two transistors form a current-generating network in conjunction with the associated emitter networks designated generally by the numeral 66. The output current from the transistor 63 is divided and channelled into transistors 67 and 68, the bases of which are connected in common with transistors 69 and 71 which receive a signal from transistor 64.

The common base stages following the common emitter circuit formed transistors 67, 68, 69 and 71 are connected so as to channel their output into an output lead 72, generally taking the form of a coaxial cable, terminating in a coaxial terminal abranch circuit 74 also connects with the output of transistors 67—71 and is connected through a plurality of ferrite beads 76 to the input of an offset control circuit designated generally by the numeral 77. These ferrite bead devices are instrumental in providing a high impedance path for the high frequency components of the output pulse. By such action the offset control circuit is AC isolated from the output circuit thereby providing an output pulse of high fidelity.

The offset control circuit is formed by a pair of transistors 78 and 79 having their collectors connected in common and connected to input lead 74. The base of transistor 79 is connected through an appropriate lead as shown to an offset control designated generally by the numeral 81 and comprising a vernier controlled potentiometer adjustable so that transistor 79 provides a reverse current which cancels the current out of transistor 78.

From the foregoing it will be apparent that the circuitry embodied in the third generation pulse generator of FIG. 5 provides for independent control of amplitude offset through the utilization of circuitry which embodies a minimum of components. As indicated in the drawing, the output from coaxial terminal 73 constitutes a negative-going pulse that is exactly complementary in amplitude and shape to a positive pulse emanating simultaneously from the output terminal 73' which forms the terminus for signals emanating from pulse width, amplifier and offset control circuitry complementary to the circuits just described. Since these circuits are essentially identical, primed reference numerals have been applied to designate similar components.

Each of the offset control circuit means 77 and 77' independently controls the offset for each th the output terminals 73 and 73' and is adjustable to shift the pulse in its entirety relative to a predetermined plane of reference which may be ground, without changing the value of the absolute amplitude. The range of adjustment is such that each pulse may be shifted into a negative range in which the negative portion of the amplitude may be up to 20 percent of the absolute amplitude. Such an offset control circuit expands the capability of the generator to test a larger number of electronic device families. In a typical pulse device, a 10 volt output has been produced when the offset is adjusted to a 2 volt negative amplitude. In connection with the positive and rapid circuit turnoff, inasmuch as the offset can be adjusted into a negative region, it will be apparent that such a characteristic may be used advantageously on an NPN transistor; for example, to reverse the bias by imposition of the ononactive pulse condition.

Typical values for the various resistors—capacitors utilized in a typical pulse generator of the type illustrated in FIG. 5 are as indicated in the tabulation which follows:

RESISTORS

R1, 7, 25, 26, 51, 97, 102 and 103—2.2K, ½ W., 5%
R2, 3, 8, 15, 17, 19, 21, 50 and 96—1K, ½ W., 5%
R4, 13 and 23—75K potentiometer on S1, 2 and 3, 2 W. carbon, 10%
R5, 14 and 24—3.6K, ½ W., 5%
R6, 16 and 18—10K, ½ W., 5%
R9, 60, 61, 62, 63, 66, 73, 80—83—10Ω, ½ W., 5%
R10 and 11—2.7K, ½ W., 5%
R12—51Ω, ½ W., 5%
R20—10K Pot., 2 W., carbon, 10%
R22—32K, ½ W.
R27, 28, 45, 57, 68, 69, 71, 76, 79 and 90—220Ω, ½ W., 5%
R29, 55, 74 and 99—100Ω, ½ W., 5%
R30 and 31—680Ω, ½ W., 5%
R32—2.7Ω, 2 W.
R33—100Ω, 2 W., 5%
R34—1.8K, ½ W., 5%
R35 and 37—1Ω, ½ W., 5%
R36—10Ω, 2 W., 5%
R38, 52, 53, 95 and 100—82Ω, ½ W., 5%
R39 and 40—12Ω, 2 W., 5%
R41, 48, 64, 84, 87 and 92—390Ω, ½ W., 5%
R42 and 86—330Ω, ½ W., 5%
R43 and 54; R88 and 101—500Ω, 2 W., carbon, 10%
R44 and 89—120Ω, ½ W., 5%
R46, 65, 72, 85 and 93—470Ω, ½ W., 5%
R47 and 94—51Ω, ½ W., 5%
R49 and 91—120Ω, ½ W., 5%
R56, 58, 59, 77, 78 and 98—22Ω, ½ W., 5%
R66 and 75—150Ω, ½ W., 5%
R70—560Ω, ½ W., 5%

CAPACITORS

C1 and 39—47mf., 6 V.
C2—4.7mf.
C3—.47mf.
C4—.047.
C5—.0047.
C6—470 pf.
C7—47 pf.
C8, 9, 11, 18, 21, 24, 30 and 34—.1, 10 V.
C10 and 12—5 mf., 12 V.
C13 and 25—1 mf.
C14 and 26—.1 mf.
C15 and 27—.01 mf.
C16 and 28—.001 mf.
C17 and 29—100 pf.
C19 and 20—.05 mf., 600 v.
C22, 23, 40 and 71—500 pf., 1 kv.
C31—50 mf., 6 v.
C32, 44 and 76—100 pf., 1 kv.
C33—250 mf., 12 v.
C35—4,000 mf., 25 v.
C36—50 mf., 25 v.
C37 and 38—5,000 mf., 15 v.
C41, 43, 48, 56, 58 and 59—.01 mf., 100 v.
C42, 54, 55, 60, 70 and 73—10 mf., 20 v.
C45 and 75—1.5-20 pf., 175 v.
C46 and 65—47 mf., 20 v.
C47, 49, 62 and 64—50 pf., 1 kv.
C50, 51, 52, 53, 66, 67, 68 and 69—.1 mf., 16 v.
C57—22 mf., 15 v.

Having thus described our invention, what is claimed to be novel and sought to be protected by letters patent is as follows:

I claim:

1. A simultaneous complementary output pulse generator comprising:
   a. an oscillator circuit selectively adjustable to provide a linear train of output pulses at a selected frequency;
   b. a pulse delay control circuit sequentially connected to the output of the oscillator circuit and including first and second output circuits the pulsed output of each of which is the complement of the other, each said output circuit being adjustable to selectively delay in point of time a predetermined point of reference associated with the output from said oscillator circuit;
   c. a pulse width control circuit sequentially connected to the output of the pulse delay control circuit and adjustable to control the width of pulses emanating
   d. an amplifier circuit connected to the output of the pulse width control circuit and including first and second pulse to the branches, the pulsed output of each branch being complementary to the pulsed out of the other branch; and
   e. a power supply circuit operably connected to energize the oscillator, delay control circuit, width control circuit and amplifier.

2. The combination according to claim 1, in which said oscillator circuit has a frequency capability up to 10 megahertz.

3. The combination according to claim 1, in which the rise and fall time of pulses emanating from the amplifier circuit is the order of 5 nanoseconds.

4. The combination according to claim 1, in which the amplitude of the output of said oscillator is positive.

5. The combination according to claim 1, in which said oscillator constitutes a free-running multivibrator provided with a feedback circuit for sustaining free-running oscillation.

6. The combination according to claim 1, in which said delay control circuit is adjustable to interpose a delay in excess of 360° of signal time or the interval of one oscillator period.

7. The combination according to claim 1, in which said delay control circuit is adjustable over a range sufficiently broad to reduce the output frequency of the delay control circuit from one-half to as little as one-tenth the output frequency of the oscillator.

8. The combination according to claim 1, in which said delay control circuit includes a single-shot multivibrator capable of operating at a 100 percent duty cycle.

9. The combination according to claim 1, in which the rise and fall time of pulses emanating from said delay control circuit is in the order of 5 nanoseconds.

10. The combination according to claim 1, in which the complementary outputs from said delay control circuit exhibit both positive and negative going amplitude characteristics with all parts of both pulse chains being in a positive voltage region above ground.

11. The combination according to claim 1, in which the trailing edge of a pulse emanating from the delay control circuit is controlled remotely from the front panel of the pulse generator by actuating switches controlling capacitors and a vernier controlling a potentiometer.

12. The combination according to claim 1, in which said width control circuit includes a single-shot multivibrator adjustable to control the position of the trailing edge of each pulse emanating therefrom in relation to the leading edge of the pulse.

13. The combination according to claim 1, in which the width control circuit is triggered by the trailing edge of pulses emanating from the delay control circuit.

14. The combination according to claim 1, in which the leading edge of a pulse emanating from the width control circuit is places by the voltage transition of a pulse emanating from the delay control circuit.

15. The combination according to claim 1, in which the trailing edge of a pulse emanating from the width control circuit is controlled remotely from the front panel of the pulse generator by actuating switches controlling capacitors and a vernier controlling a potentiometer.

16. The combination according to claim 1 in which the width of pulses emanating from the width control circuit may be controlled in point of time in the range between 35 nanoseconds to 4 seconds.

17. The combination according to claim 1, in which said amplifier is formed from an integrated circuit having two output chains one of which is positive and the other of which is complementary thereto.

18. The combination according to claim 1, in which the output pulses from said amplifier have a rise and fall time of approximately 5 nanoseconds.

19. The combination according to claim 1, in which said amplifier incorporates means for minimizing the inductive and capacitive effects of the load or output circuit to maximize the fidelity of the high power output pulse from the amplifier.

20. The combination according to claim 1, in which said amplifier circuit is formed from discrete transistor components.

21. The combination according to claim 1, in which an amplifier circuit which performs the function of asynchronous gating is operatively interposed between said oscillator and said delay control circuit.

22. The combination according to claim 1, in which said generator is provided with a differentiating network, and one of the output terminals of said delay control circuit is channeled to said differentiating network.

23. The combination according to claim 1, in which a flip-flop circuit or bistable multivibrator is provided operable to transmit a single pulse through the generator when the flip-flop circuit is connected to the delay circuit in place of the oscillator and selectively energized.

24. The combination according to claim 1, in which an external trigger circuit is provided energized by an external source of signals and is selectively operable when the oscillator is cut from the circuit to substitute means to control time of pulses generated and fed to the delay control circuit.

25. The combination according to claim 1, in which a synchronous gating circuit is provided operatively associated with the oscillator and adjustable to provide and control pulse bursts from the oscillator in synchronism with the pulses from the input of the synchronous gating circuit.

26. The combination according to claim 1, in which said oscillator is provided with a feedback circuit, and a synchronous gating circuit is provided operatively interposed in said feedback circuit and adjustable to control the number of pulses in a pulse burst emanating from the oscillator.

27. The combination according to claim fourth in which an asynchronous gating circuit is provided operably connected between the oscillator and said delay control circuit and adjustable to control the time delay between pulse bursts emanating from the oscillator.

28. The combination according to claim 1, in which an amplitude control circuit is provided adjustable from the front panel of the pulse generator to control the amplitude of the output pulses from said amplifier.

29. The combination according to claim 1, in which an offset control circuit means is provided associated with each of the output terminals of the amplifier and selectively adjustable to shift an output pulse relative to ground without changing the amplitude of the pulse.

30. The combination according to claim 1, in which offset control circuit means are provided associated with each output terminal of said amplifier, each said offset control circuit means independently adjustable to shift the output pulse with which it is related relative to ground without changing the amplitude of the output pulse, the extent of such shift ranging from a positive to a negative value of plus or minus 20 percent of the maximum pulse amplitude.

31. The combination according to claim 30, in which a negative voltage source is provided in said power supply to activate said offset circuit.